March 17, 1942.  H. FRAUENTHAL  2,276,384
BEARING MEANS
Original Filed March 19, 1938
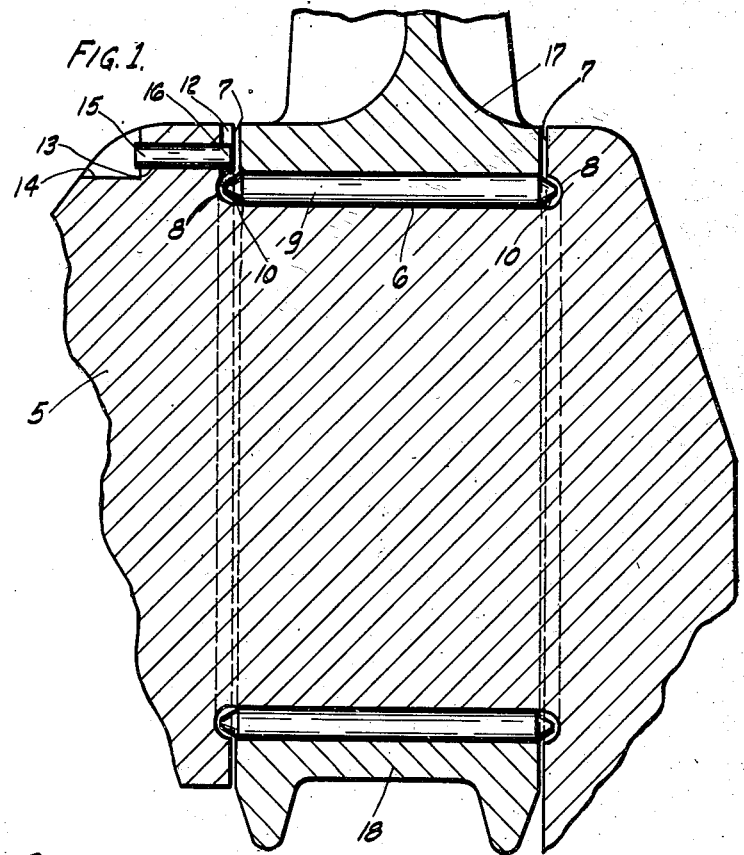
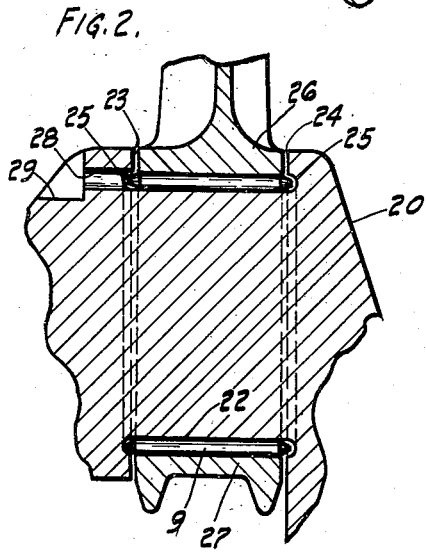
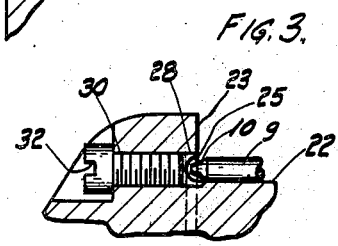
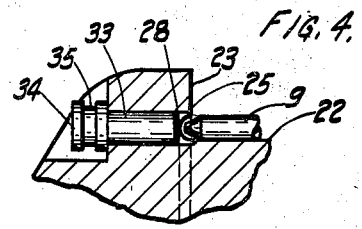
INVENTOR.
HAROLD FRAUENTHAL.
BY Walter E. Schirmer
ATTORNEY.

Patented Mar. 17, 1942

2,276,384

UNITED STATES PATENT OFFICE 2,276,384

BEARING MEANS

Harold Frauenthal, South Bend, Ind., assignor to Bantam Bearings Corporation, South Bend, Ind., a corporation of Indiana Original application March 19, 1938, Serial No. 196,818. Divided and this application September 16, 1939, Serial No. 295,166

4 Claims. (Cl. 308—207)

This invention relates to bearing means, and more particularly is directed to bearing means for crankshaft journals and the like in which needle bearings are employed for rotatably supporting the connecting rods, crank arms or the like on the crankshaft journals.

It has been proposed recently to supplant the well known Babbitt metal type of bearing, heretofore employed, by the use of needle bearing means. This has introduced serious problems of installation and assembly, and in its broader aspects, the present invention contemplates the reduction of such problems or their elimination.

One of the primary objects of the present invention is to provide anti-friction bearing means between an inner cylindrical bearing race defined by radially extending cheeks, and a member encircling said race between said cheeks, the bearing means comprising rollers retained by suitable means associated with said cheeks against outward displacement. The invention is applicable to all shaft constructions in which a splitting of the bearing member is required in order to assemble the bearing.

In a construction in which such bearings are employed it has been found extremely difficult to provide proper means for retaining the needle bearings in place as the crank arm or connecting rod is assembled about the journal. The present invention contemplates improved means for effecting this result whereby the needle rollers will be held in proper position independently of the crank arm or connecting rod.

One of the features of the present invention is the provision of suitable means cooperating with the roller members to permit their ready positioning about the bearing race, and which will serve to lock the same in position against displacement while still permitting the connecting rod or the like to be assembled to or disassembled from the assembly.

Another feature of the present invention resides in utilizing the cheeks on opposite sides of the journal as a means for retaining the anti-friction rollers in position.

Still another feature of the invention resides in the provision of means whereby the last few anti-friction rollers may be placed in position by movement axially of the raceway, and may then be moved circumferentially in the race-way and retained against outward displacement by means of cooperating grooves in the cheeks.

Other objects and advantages of the present invention will appear more fully from the following detailed description which, taken in conjunction with the accompanying drawing, will disclose to those skilled in the art the particular construction and operation of the preferred form of the present invention.

In the drawing:

Figure 1 is an elevational sectional view of a crankshaft bearing embodying the present invention;

Figure 2 is a corresponding sectional view of a slightly modified form of the invention;

Figure 3 is an enlarged detail view of Figure 2 showing one manner of locking the bearing means in position; and Figure 4 is a view corresponding to Figure 3 showing a different type of locking means.

Referring now in detail to the drawing, I have indicated at 5 in Figure 1 a crankshaft having the crankshaft journal portion 6 which, on opposite ends thereof, is provided with the radially extending cheeks 7 defining the bearing surface.

Each of the cheek portions 7 is defined with an axially directed annular groove 8 extending from the ends of the bearing surface 6 and of a radial depth substantially equivalent to the diameter of the roller members 9. The entire surface of the journal portion 6 is adapted to receive the antifriction roller members 9 which are of a length greater than the axial distance between the cheeks 7. It is therefore apparent that the tapered ends 10 of the rollers project into the axial recesses 8, and are thereby retained against outward radial displacement when positioned with their opposite ends within the recesses 8.

In inserting the roller members into position, they are preferably turned askew with respect to the cheeks 7 until the ends can be passed downwardly between these cheeks into a position such that upon turning of the rollers so that their axes lie parallel with the axis of the journal 6 the ends 10 of the rollers will move into the grooves 8.

In order to place the last few rollers 9 in position when there is no longer room for skewing the roller members in order to pass them down between the cheeks 7, it is necessary to provide some other means for moving the rollers into position on the bearing journal. In order to accomplish this, I provide a radially directed groove 12 in the face of one of the cheeks 7, as indicated in Figure 1, and provide an axially directed opening 13 in the crankshaft which is disposed radially outwardly of the surface 6 and which opens from a recessed portion 14 of the crankshaft cheek into the groove 12. The last few rollers may be inserted by allowing one end thereof to be moved into the groove 8 opposite the radial groove 12, and to then allow the other end to drop down through the slot or groove 12 into position on the journal surface 6. The roller may then be moved circumferentially into position.

In order to prevent any possible outward displacement of the rollers after all of the rollers have been assembled about the journal 6, I provide a drive pin 15 which is driven into the opening 30 to a position such that the end 16 thereof overlies the tapered end 10 of the last roller, which is positioned in alinement with the groove 12. This blocks any passage of the roller end 10 radially outwardly through the groove or slot 12, thereby maintaining all of the rollers against radial displacement by reason of the engagement of the trunnion ends 10 thereof in the axially facing grooves 8 formed annularly at the ends of the journal surface 6.

It is thus apparent that with this construction the rollers 9 are all located in such position that they cannot move outwardly with respect to the bearing surface 6 because of the engagement of the ends thereof in the recesses 8 in the defining cheeks of the journal. Also, since the rollers completely fill the circumferential gap between the connecting rod 17 and the surface 6, there is no possibility for any roller member to become skewed into position such that its ends could be released from the grooves 8. Thus, the construction shown in Figure 1 positively insures the retention of the roller members in position independently of the connecting rod 17 or its bearing cap 18, and also provides for direct bearing engagement of the connecting rod on the rollers without the necessity of forming recesses in the hub portion of the connecting rod, as is necessary in the construction shown in my copending application, Serial No. 196,818, filed March 19, 1938, now Patent No. 2,248,615, issued July 8, 1941, of which the present application is a division. It is to be noted that the end 16 of the pin 15 overlies the rollers in such manner as to complete the peripheral surface of the associated groove 8.

In the embodiment of the invention shown in Figures 2 to 4, inclusive, the crankshaft 20 is provided with a bearing journal portion 22 defined by the radial cheeks 23 and 24 corresponding to the cheeks 7 of Figure 1. Each of the cheeks is provided with axial recesses 25, as described in connection with Figure 1, these recesses forming a continuation of the journal surface 22 and being of a radial depth substantially equal to the diameter of the rollers 9. A suitable connecting rod 26 is disposed between the cheeks 23 and 24, and retained in position by means of the bearing cap 27.

It will be noted that the rollers 9 are of greater axial extent, including their tapered trunnion ends 10, than the axial distance between the cheeks 23 and 24, and consequently they must be positioned in the bearing journal by skewing into the grooves 25 and then moving them into axial alinement with respect to the journal with the ends thereof retained within the recesses 25. However, as noted in connection with Figure 1, it is impossible to place all of the rollers in position in this manner as there is not sufficient room for the last three or four rollers to be skewed in this manner.

In order to place these last few rollers to complete the bearing assembly, I provide the opening 28 in the crankshaft cheek 23, this opening being in direct axial alinement with the associated groove 25. The crankshaft cheek is recessed on its external surface as indicated at 29 to provide for access to the opening 28. Through this opening 28, the roller members 9 may be passed axially into position and then moved circumferentially to make way for the next succeeding roller. After these last few rollers have been thus placed in position, it is necessary to provide some means for holding the last roller against axial movement outwardly through the opening 28.

For this purpose I may provide screw threads in the opening 28 adapted to receive the threaded plug 30 which is thereby screwed into the opening 28 in a position such that the inner end thereof terminates in substantially radial alinement with the inner portion of the groove 25. The head of the screw 30 is preferably kerfed, as indicated at 32, to receive a screw driver or similar tool for threading the same into the opening 28. It will be noted that with such a construction the roller 9 is prevented from axial outward movement through the opening 28, and all of the rollers are thereby retained against radial displacement by means of the ends 10 being engaged in the annular axially facing grooves 25.

Considering the modification of the invention shown in Figure 4, similar reference numerals indicate similar parts. In this embodiment of the invention the opening 28 is closed by means of a drive pin 33 which is provided with a large head portion 34 having the annular groove 35 therein. In some cases it may be advisable to withdraw the pin 33 in order to replace or remove the roller bearings, and for this purpose, a draw member comprising a U-shaped clip or the like can be engaged in the groove 35 whereby suitable leverage can be obtained for exerting axial outward pressure on the pin 33 to withdraw it from the opening 28, thereby allowing disassembly of the bearing.

It is therefore believed apparent that I have provided a novel type of bearing assembly whereby the needle bearings or similar anti-friction bearing means can be readily assembled, the crankshaft journal providing means for holding the bearing means in position independently of the connecting rod so that detachment of the connecting rod will not disturb the bearing assembly. Also, the present construction allows disassembly of the bearing if it is desired to remove or replace any roller members without requiring any operation other than the removal of the pin members.

I am aware that various changes in details of the construction may be made without in any way departing from the underlying principles of the present invention, and I therefore do not intend to be limited except as defined by the scope and spirit of the appended claims.

I claim:

1. A bearing journal including a cylindrical surface defined by radially outwardly extending end faces, an annular groove of semi-cylindrical section formed in each of said faces at the junction thereof with said cylindrical surface, a radial groove formed in one of said faces and communicating at its inner end with the corresponding annular groove, a plurality of anti-friction rollers of an axial length greater than the distance between said faces and adapted to be disposed on said cylindrical surface with the ends thereof retained in said grooves, said radial groove allowing for positioning of certain of said rollers on said cylindrical surface by passing the roller end radially inwardly through said groove, and axially directed plug means adapted to project into said radial groove into a position overlying the axial groove to prevent outward displacement of a roller end through said radial groove.

2. A bearing assembly for a crankshaft journal defined by radially extending cheeks, comprising a plurality of anti-friction rollers, means forming axially directed annular recesses about said journal surface between said cheeks, said rollers being positioned with the opposite ends thereof retained in said recesses against outward displacement, means extending radially outwardly through one of said cheeks from the associated recess for guiding said rollers therethrough and including a radial groove in said cheek extending to said recess, whereby said rollers may be moved into retained position in said recesses by passing one end through said groove into position and a plug in said one cheek for blocking said radial groove to prevent outward passage of a roller end through said groove.

3. A bearing assembly for mounting a connecting rod on a crankshaft journal, said journal comprising an inner bearing race defined by integral cheek portions having radial faces forming axial abutments for said rod, means forming axially facing annular recesses in said radial faces beyond the ends of said race, a plurality of needle rollers adapted to be disposed axially on said race and having trunnion ends, the overall length of said rollers being greater than the axial distance between said faces, a radial groove in one of said faces extending outwardly from the annular recess to receive the end of said rollers for inserting said rollers in position on said race with the ends retained in said recesses, said cheek portion having an axial bore therethrough radially spaced outwardly of said race and opening at one end into said radial groove, and a plug adapted to be pressed through said bore with one end projecting into said groove radially outwardly of said recess.

4. A bearing for a crankshaft journal comprising an annular race having integral planar radially extending end walls, an annular recess cut into the end wall at each end of the race to form facing channels, needle roller elements having trunnion ends and of a length exceeding the distance between said end walls, a radial groove in one end wall of a depth substantially equal to that of the associated recess leading from said recess out to the end of said wall providing for insertion of said elements into position about said race with the ends thereof retained in said annular recesses, an axially directed bore in said one end wall extending into said radial groove at a point spaced radially outwardly of the associated recess, and a plug pressed into said bore with an end thereof projecting into said radial groove to prevent displacement of said elements from retained position.

HAROLD FRAUENTHAL.